United States Patent [19]

Kubacki

[11] Patent Number: 4,998,464
[45] Date of Patent: Mar. 12, 1991

[54] HEAT EXCHANGE DEVICE FOR FOOD

[75] Inventor: Lawrence G. Kubacki, Downers Grove, Ill.

[73] Assignee: Process Systems Inc.

[21] Appl. No.: 548,272

[22] Filed: Jul. 2, 1990

[51] Int. Cl.⁵ .................... A23C 3/04; A23G 1/18
[52] U.S. Cl. ........................... 99/455; 62/354;
99/348; 99/470; 99/483; 165/94; 366/147;
366/309; 366/312
[58] Field of Search .............. 99/348, 452, 455, 460,
99/462, 470, 483, 484; 366/147, 309, 312;
62/343, 353, 354; 165/94, 95; 426/519, 520,
524, 660

[56] References Cited

U.S. PATENT DOCUMENTS

| | | | |
|---|---|---|---|
| 2,677,942 | 5/1954 | Schott et al. | 366/309 |
| 3,770,252 | 11/1973 | Gordini et al. | 366/312 |
| 4,059,047 | 11/1977 | Sollich | 99/455 |
| 4,279,295 | 7/1981 | Duckworth | 165/94 |
| 4,402,615 | 9/1983 | Mayer | 366/312 |
| 4,465,376 | 8/1984 | Baumgartner et al. | 366/312 |
| 4,515,483 | 5/1985 | Muller et al. | 366/312 |
| 4,648,315 | 3/1987 | Blum | 99/455 |
| 4,892,033 | 1/1990 | Sollich | 62/354 |

*Primary Examiner*—Timothy F. Simone

[57] ABSTRACT

A heat exchange device that can be used for continuously cooling or heating a slurry of food consisting of lumps in a non-viscous liquid. The device comprises several vertically spaced heat transfer trays in alignment with each other and each having an opening extending therethrough, that is not in alignment with like openings of adjacent trays, and having raised portions next to the openings to restrict the rapid flow of liquid through the openings, so the food slurry has to be pushed or scraped by slowly moving scraper members to each opening, where it can fall by force of gravity to an adjacent lower tray.

20 Claims, 3 Drawing Sheets

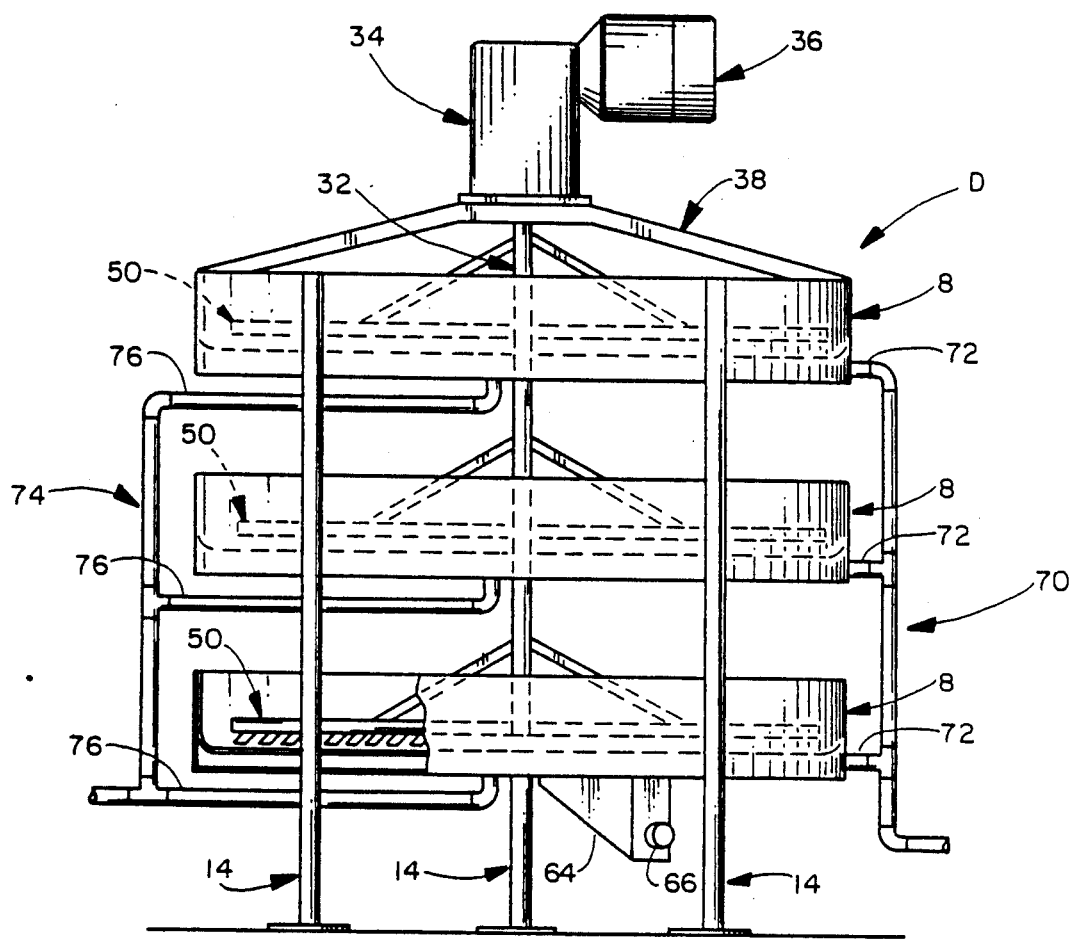
FIG. 3
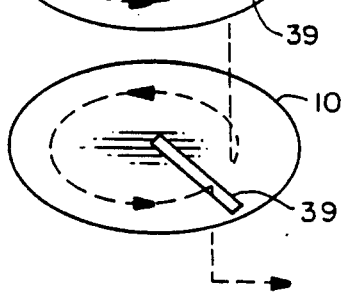
FIG. 4
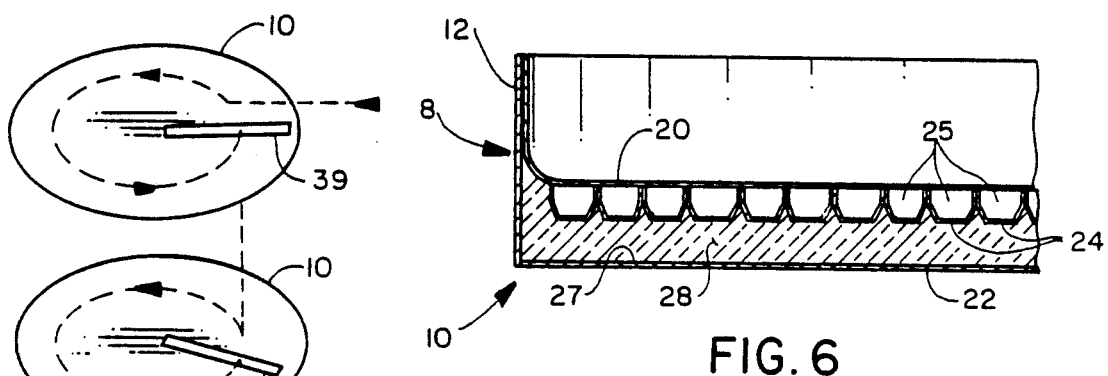
FIG. 6
FIG. 7

4,998,464

HEAT EXCHANGE DEVICE FOR FOOD

BACKGROUND OF THE INVENTION

1. Field of the Invention:

This invention relates to heat exchange devices, and more particularly to a continuous heat exchange device for cooling or, in the alternative, heating a slurry of food consisting of solid particles or lumps in a non-viscous liquid.

2. Description of the Background Art:

A background art search directed to the subject matter of this application conducted in the United States Patent and Trademark Office disclosed the following United States Letters Patent Nos.: 1,375,210, 2,677,942, 3,770,252, 4,059,047, 4,279,295, 4,558,733, 4,648,315.

None of the patents uncovered in the search discloses a heat exchange device for cooling or heating a slurry of food consisting of lumps in a non-viscous liquid, which device comprises several vertically spaced heat transfer trays in alignment with each other and having non-aligned openings which allow the food slurry to pass by gravity from tray to tray, after it has been in contact with the heat exchange plate of each tray, and wherein each of the plates have means adjacent the openings for preventing the liquid from passing too rapidly from tray to tray without being pushed by over the entire surface of each plate by the scraper means.

SUMMARY OF THE INVENTION

It is an object of the present invention to provide a heat exchange device for cooling or heating a slurry of food, comprising solid lumps or particles in a non-viscous liquid, without damaging the particles or otherwise destroying their integrity.

Another object of the invention is the provision of a heat exchange device for food wherein the food, in the form of a slurry, is moved slowly over a series heat exchange plates, and drops from one plate to another without being placed under pressure.

A more specific object of the invention is the provision of a heat exchange device for food that includes a plurality of trays, each including a heat exchange plate, wherein the slurry of food is moved over each plate slowly by scraper means to the point where it drops through an opening in the plate to the next lowermost plate for a similar operation.

These and other objects of the invention will be apparent from an examination of the following description and drawings.

BRIEF DESCRIPTION OF THE DRAWINGS

FIG. 3 is a side elevational view of the structure in FIG. 1;

FIG. 4 is a schematic diagram illustrating the path of the flow of food through the device illustrated in FIGS. 1 and 3;

FIG. 6 is a fragmentary vertical sectional view taken on line 6—6 of FIG. 5;

FIG. 7 is an enlarged sectional view taken on line 7—7 of FIG. 5, showing the function of the raised portions that are located adjacent the opening in the heat exchange plate;

It will be understood that, for purposes of clarity, certain elements may have been intentionally omitted from certain views where they are believed to be illustrated to better advantage in other views.

DESCRIPTION OF THE PREFERRED EMBODIMENT

A study of the prior art in the field of food heat exchange devices indicates that substantially all of the continuous cooling or heating devices are designed to force a food product under pressure through the device at a relatively high degree of speed. Such an apparatus may be suitable for a homogenous mixture, such as a soup or sauce, where the integrity of which will not be destroyed by forcing it through a heat transfer device rapidly or under pressure.

The device of the present invention is designed to cool or heat food products with large solid particulates in a non-viscous liquid. Some examples of these products are: chili with ground beef and beans, stews with potatoes or other vegetable chunks, and pie fillings with whole or sliced fruit.

Consumers today are more sophisticated and are looking for prepared foods that have a "homemade" look. Stews, chili, pie fillings and other products with have solid particulates must have the integrity of the particulates maintained. Prepared foods that look and taste like mush meet with great consumer buying resistance.

Most of the continuous cooling and heating devices available today, as well as those described in the patent literature, will not allow the cooling or heating of food products of the type described without macerating the solid particulates of the food. These devices are designed to heat and cool viscous non-thermally conductive, homogenous products such as margarine, chocolate syrup, and other products that do not have entrained solid particulates.

When cooling or heating or cooling viscous products of the type described, the product must be pumped rapidly and under high pressure through the cooling or heating chambers, since the flow through the devices is highly restrictive. This action of pumping the food under pressure, or moving it with high speed scraper blades, tends to destroy the integrity of food particulates in the product.

The present invention is designed to move a food slurry with particulates very slowly over a series of cooling or heating plates by slowly rotating the scraper blades that push the food over the plates to openings where it drops to the next lower-most plate for the process to be repeated.

Figure 1:
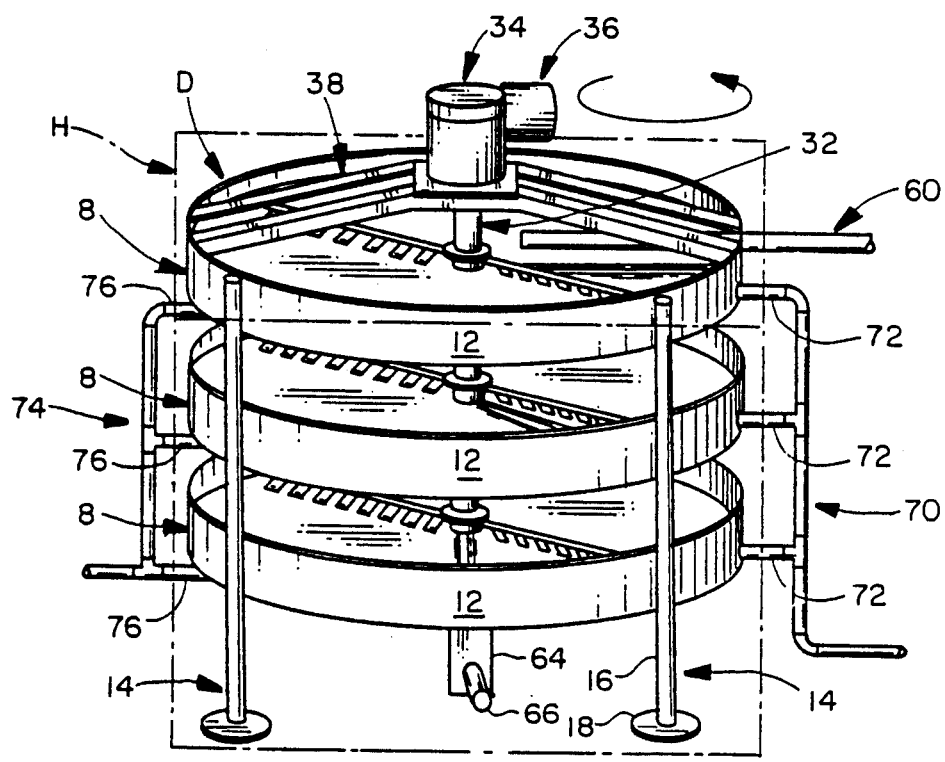
FIG. 1 is a fragmentary isometric view of a heat exchange device embodying features of the present invention.

Turning now to the drawings for a better understanding of the invention, it will be seen that a heat exchange device embodying features of the present invention is indicated at D in FIGS. 1 and 3. The device is intended to cool or heat a slurry S of food containing particulate pieces or lumps P in a non-viscous liquid L, as illustrated in FIG. 7.

Again returning to FIGS. 1 and 3, it will be seen that the device includes a plurality of horizontally disposed vertically spaced heat transfer trays, each indicated generally at 8. Each of the trays includes a hollow heat transfer plate 10 having a peripheral vertical wall 12 upstanding therfrom. The various heat tranfer trays 8 are interconnected in vertically spaced relation by a plurality of columns 14, which are attached to each of the heat transfer trays, and which have lower portions or legs 16 extending downwardly below the lowermost tray. Legs 16 have pads or feet 18 attached to their lower extremities to support the device D in a level position on horizontal surface.

Although it may not be necessary to enclose the trays within a housing, if desired, the trays may be be enclosed within a housing, indicated in phantom line at H in FIG. 1 of the drawings. This is an optional arrangement.

Turning now to FIG. 6 of the drawings, it will be seen that the heat transfer plate 10 of each heat transfer tray 8 is hollow and includes horizontally disposed, vertically spaced upper and lower walls 20 and 22, respectively, and a generally spiral baffle or tube 24 interposed between the upper and lower walls to provide an opening 25 for the passage of cooling or heating fluids between through the plate to keep it cool or hot. There also may be provided between the upper and lower walls of each plate, insulation indicated generally at 28 in FIG. 6.

Figure 5:
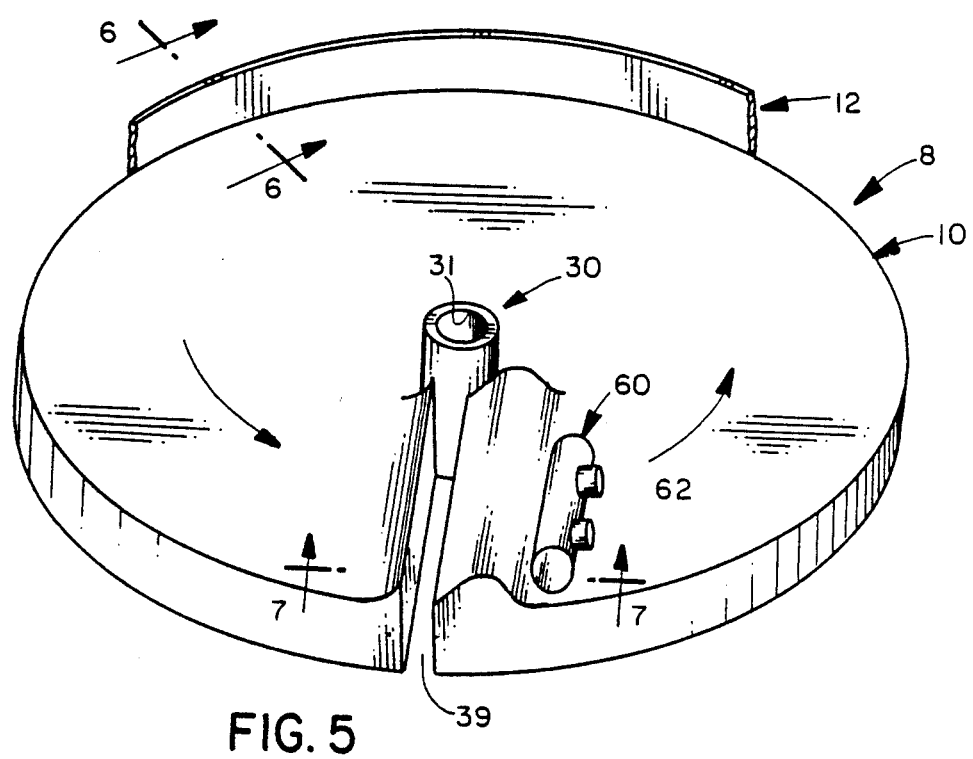
FIG. 5 is an enlarged isometric view of one of the heat exchange trays illustrated in FIGS. 1 and 3, with portions of the structure broken away.

Referring now to FIG. 5 of the drawings, it will be seen that each of the plates includes a central hub or journal 30 having an axial bore 31 extending vertically therethrough for receipt of a vertically extending drive shaft 32, the upper end of which is connected to a gear box 34, which in turn is connected to a motor 36.

Figure 2:
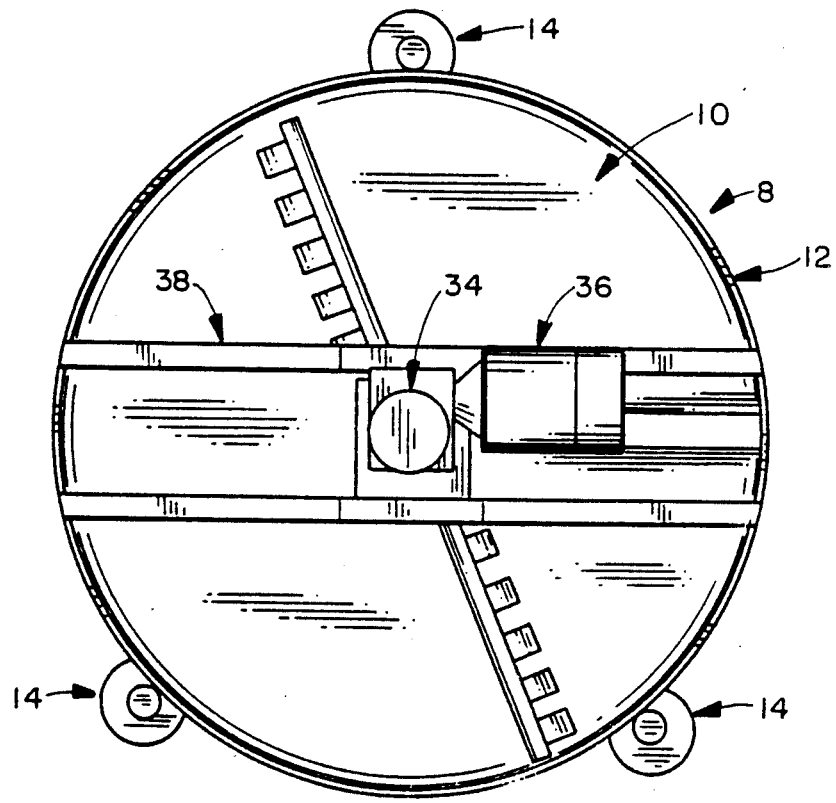
FIG. 2 is a top plan view of the structure illustrated in FIG. 1.

The gear box and motor are mounted on a frame 38 which is attached to the uppermost heat transfer tray 8, as best illustrated in FIGS. 1 and 2. The purpose of the gear box and motor is to drive the drive to move the scraper members 50 which are described later in the specification.

Figure 8:
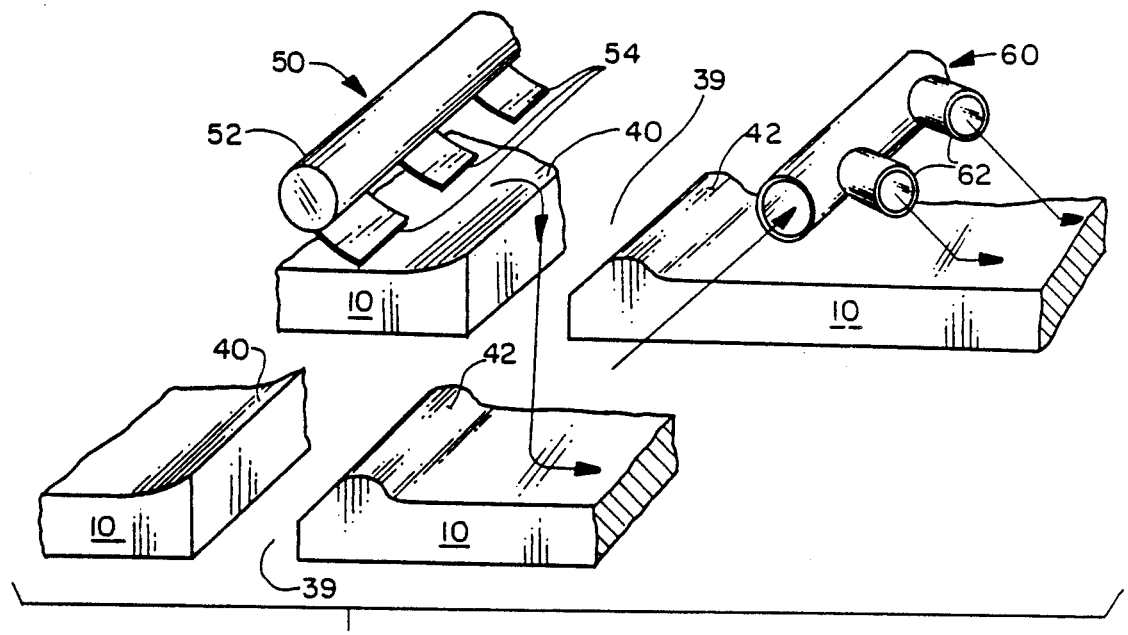
FIG. 8 is a fragmentary exploded view of a portion of the structure illustrated in FIG. 5.
Figure 9:
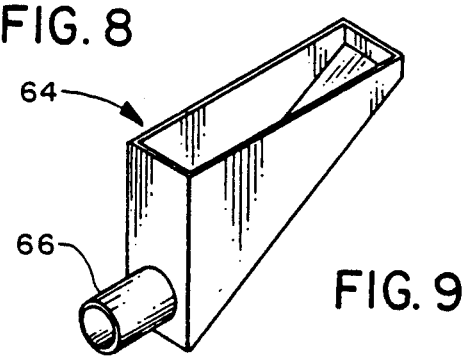
FIG. 9 is a perpective view of the food outlet trough illustrated in FIG. 1.

Referring now to FIGS. 5, 7, and 8, it will be seen that each of the heat transfer plates 10 has a radially disposed opening 39 extending therethrough. The opening extends from the hub 30 of the plate to the outer periphery of the plate. The purpose of the opening is to permit food to drop from the plate through the opening to the next lowermost plate of the device, as illustrated in FIG. 4 of the drawings.

It will be seen that raised portions or dams 40 and 42 are provided on the leading and trailing sides of each plate opening 39. The purpose of these dams is to prevent the non-viscous liquid from passing too rapidly from one plate to the other. The dams help retain the non-viscous liquid on the plate until a slow-moving scraper member forces the food, including both particulate and liquid, up over the raised portions and into the openings, as illustrated in FIGS. 7 and 8.

Still referring to FIG. 8, it will be seen that over each plate is a scraper member indicated generally at 50, which has a rigid agitator arm 52 attached at its inner end to the drive shaft 32, and which has a plurality of flexible scraper blades 54 extending downwardly therefrom for engagement with the food slurry to move it along the plate.

In order to protect the integrity of the particulates of food, the scraper members are designed to rotate at a relatively low rate of speed, not in access of fifty (50) revolutions per minute. Also to protect the integrity of food, it will be seen that the space between the plates of each of the adjacent heat transfer trays is greater than the widest or thickest dimension of any food particulate. The spacing between plates is also greater than the height of the scraper members, so that particulates of food in the slurry will not be crushed or damaged in any way as the scraper members slowly move the food slurry over the heat transfer plates.

Turning now to FIGS. 1 and 5, it will be seen that the food slurry enters the uppermost heat transfer tray of the device through an inlet manifold 60, having a plurality of outlets 62 which introduce the food into the upper surface of the uppermost tray plate at the trailing side of opening 29. Thus, the food will be pushed over the entire surface of the plate before it is returned to the opening, where it drops to the plate below.

At the bottom of the device there is a food outlet in the form of a trough 64 which is positioned directly under opening 39 in the lowermost plate and which is connected to a tube 66 for carrying away the food after it has been cooled or heated.

Turning now to FIGS. 1 and 3, it will be seen that cooling or heating fluid is introduced into one side of each of the heat transfer trays through an inlet manifold 70 having a plurality of pipes 72 each connected to a plate of a transfer tray. After the fluid has been circulated through each plate, it is carried from the opposite sides of the plates by a series of conduits 76 connected to a manifold 74.

Thus, it will be appreciated that the device provides a means for continuously cooling or heating a slurry of food containing particulates slowly, without subjecting it to pressure, so the integrity of the food product will be maintained at all times.

What is claimed is:

1. A heat exchange device for continuously cooling or, in the alternative, heating a slurry of food consisting of solid lumps in a non-viscous liquid, comprising:
   (a) a plurality of heat transfer trays, aligned with each other and interconnected in vertically spaced relationship;
   (b) food inlet means connected to an uppermost tray and food outlet means connected to a lowermost tray;
   (c) each of said trays including a round, horizontal plate and a vertical wall upstanding from the periphery of said plate;
   (d) each of said plates having at least one internal passageway to accomodate the flow of fluid therethrough for cooling or, in the alternative, heating said plate;
   (e) each of said plates having a radially disposed opening extending vertically therethrough and free from alignment with an opening of any adjacent plate;
   (f) means for slowly moving a food slurry over each plate until it reaches said plate opening where it can fall by gravity therethrough onto an adjacent lower plate, said means comprising:
      (i) a rotatable drive shaft extending vertically through said plates;
      (ii) a plurality of scraper members secured to said shaft, each of said members being adapted to engage food slurry on a related plate and move it toward an opening of said plate;
   (g) each of said plates including a pair of radially disposed raised portions located on opposite sides of the plate opening to partially restrict the free flow of liquid from said plate through said opening.

2. A heat exchange device for continuously cooling or, in the alternative, heating a slurry of food consisting of solid lumps in a non-viscous liquid, comprising:
   (a) a plurality of heat transfer trays, aligned with each other and interconnected in vertically spaced relationship;
   (b) food inlet means connected to an uppermost tray and food outlet means connected to a lowermost tray;
   (c) each of said trays including a round, horizontal plate and a vertical wall upstanding from the periphery of said plate;
   (d) means for cooling or, in the alternative, heating each of said plates;
   (e) each of said plates having a radially disposed opening extending vertically therethrough and free from alignment with an opening of any adjacent plate;
   (f) means for slowly moving a food slurry over each plate until it reaches said plate opening where it can fall by gravity therethrough onto an adjacent lower plate, said means comprising:
      (i) a plurality of scraper members adapted to engage food slurry on a related plate and move it toward an opening of said plate;
      (ii) means for moving said scraper members over said plates;
   (g) each of said plates including a raised portion located adjacent the plate opening to partially restrict the free flow of liquid from said plate through said opening.

3. A heat exchange device for continuously cooling or, in the alternative, heating a slurry of food consisting of solid lumps in a non-viscous liquid, comprising:
   (a) a plurality of heat transfer trays, aligned with each other and interconnected in vertically spaced relationship;
   (b) food inlet means in communication with an uppermost tray and food outlet means in communication with a lowermost tray;
   (c) each of said trays including a round, horizontal plate and a vertical wall upstanding from the periphery of said plate;
   (d) means for cooling or, in the alternative, heating each of said plates;
   (e) each of said plates having a radially disposed opening extending vertically therethrough and free from alignment with an opening of any adjacent plate;
   (f) means for slowly moving a food slurry over each plate until it reaches said plate opening where it can fall by gravity therethrough onto an adjacent lower plate, said means comprising said plates;
      (i) a plurality of scraper members secured to said shaft, each of said members being adapted to engage food slurry on a related plate and move it toward an opening of said plate;
      (ii) means for moving said scraper members over said plates;
   (g) means to partially restrict the free flow of liquid from said plate through said opening.

4. A device according to claim 1, wherein each of said scraper members includes at least one rigid agitator arm, having one end secured to said drive shaft, and a plurality of flexible scraper blades secured to and extending downwardly from said agitator arm toward an adjacent heat transfer plate.

5. A device according to claim 2, wherein each of said scraper members includes at least one rigid agitator arm, having one end secured to a drive shaft, and a plurality of flexible scraper blades secured to and extending downwardly from said agitator arm toward an adjacent heat transfer plate.

6. A device according to claim 3, wherein each of said scraper members includes at least one rigid agitator arm, having one end secured to a drive shaft, and a plurality of flexible scraper blades secured to and extending downwardly from said agitator arm toward an adjacent heat transfer plate.

7. A device according to claim 1, wherein said heat transfer plates are spaced vertically from each other a distance greater than the overall height of any scraper member.

8. A device according to claim 2, wherein said heat transfer plates are spaced vertically from each other a distance greater than the overall height of any scraper member.

9. A device according to claim 3, wherein said heat transfer plates are spaced vertically from each other a distance greater than the overall height of any scraper member.

10. A device according to claim 1, wherein said heat transfer plates are spaced vertically from each other a distance greater that the thickness of any lump of food intended to be passed between adjacent plates.

11. A device according to claim 2, wherein said heat transfer plates are spaced vertically from each other a distance greater that the thickness of any lump of food intended to be passed between adjacent plates.

12. A device according to claim 3, wherein said heat transfer plates are spaced vertically from each other a distance greater that the thickness of any lump of food intended to be passed between adjacent plates.

13. A device according to claim 1, wherein said drive shaft and scraper members are rotated at a speed no greater than 50 revolutions per minute.

14. A device according to claim 2, wherein said scraper members are rotated at a speed no greater than 50 revolutions per minute.

15. A device according to claim 3, wherein said scraper members are rotated at a speed no greater than 50 revolutions per minute.

16. A device according to claim 1, wherein the dimensions of and spaces between the plates of said heat transfer trays are sufficiently great to allow a slurry of food to pass from said food inlet means, between said heat transfer trays, and out of said food outlet means soley by force of gravity and said scraper members and without requiring a pump type of apparatus that would place said food slurry under pressure as it moves through said device.

17. A device according to claim 2, wherein the dimensions of and spaces between the plates of said heat transfer trays are sufficiently great to allow a slurry of food to pass from said food inlet means, between said heat transfer trays, and out of said food outlet means soley by force of gravity and said scraper members and without requiring a pump type of apparatus that would place said food slurry under pressure as it moves through said device.

18. A device according to claim 3, wherein the dimensions of and spaces between the plates of said heat transfer trays are sufficiently great to allow a slurry of food to pass from said food inlet means, between said heat transfer trays, and out of said food outlet means soley by force of gravity and said scraper members and without requiring a pump type of apparatus that would place said food slurry under pressure as it moves through said device.

19. A device according to claim 3, wherein said heat transfer trays are interconnected by a plurality of vertical columns that extend below the lowermost tray to provide support for said trays.

20. A device according to claim 3, wherein said heat transfer trays are interconnected by and enclosed within an outer housing that extends below the lowermost tray to provide support for said trays.

* * * * *